United States Patent [19]

Wilson et al.

[11] 3,832,045

[45] Aug. 27, 1974

[54] WIDEBAND FREQUENCY COMPENSATION SYSTEM IN A SOUND MOTION PICTURE PROJECTOR

[76] Inventors: Stewart W. Wilson, 30 Lang St., Concord, Mass. 01742; Edwin K. Shenk, 24 Edsel Rd., Littleton, Mass. 01460

[22] Filed: Oct. 1, 1973

[21] Appl. No.: 401,988

Related U.S. Application Data

[63] Continuation of Ser. No. 294,488, Oct. 2, 1972.

[52] U.S. Cl. .......................... 352/25, 352/17, 352/29, 352/30

[51] Int. Cl. .......................... G03b 31/02

[58] Field of Search .............. 352/17, 20, 25, 29, 30, 352/37

[56] References Cited

UNITED STATES PATENTS 2,679,187 5/1954 Bitting, Jr. .............................. 352/17

2,892,900 6/1959 Guttwein .............................. 352/17

*Primary Examiner*—Samuel S. Matthews
*Assistant Examiner*—Russell E. Adams, Jr.
*Attorney, Agent, or Firm*—John W. Ericson

[57] ABSTRACT

A frequency deviation compensation system in which an information signal is recorded on a record medium simultaneously with a pilot reference signal. A reproducing system is provided in which samples of the recorded information are read from the record into a storage register at a rate determined by the reproduced pilot signal, and read out of the storage register at a fixed rate to compensate for differences in the speeds at which the information is stored on, and retrieved from, the record.

18 Claims, 8 Drawing Figures

PATENTED AUG 27 1974

3,832,045

SHEET 5 OF 5

WIDEBAND FREQUENCY COMPENSATION SYSTEM IN A SOUND MOTION PICTURE PROJECTOR

This is a continuation of application Ser. No. 294,488, filed October 2, 1972.

This invention relates to information storage and retrieval, and particularly to a novel frequency deviation compensation system in which the effects of differences in storage and retrieval speeds on the frequency of a recorded signal are reduced.

Storage of information on a record medium by sweeping a transducer over the record medium, and the subsequent retrieval of the information by sweeping another transducer over the record medium, usually result in variations in frequency between the recorded and reproduced signals because of instantaneous differences in the speed at which the recording and playback transducers are moved relative to the record medium. Such effects are commonly termed wow and flutter, and are inherent in tape and disk recorders. Thus, one measure of the quality of a tape recorder is the degree to which these effects have been reduced by the attainment of precise and constant tape transport speeds.

A particularly onerous frequency deviation problem is encountered in the production of sound motion pictures for which the sound track is to be recorded on the film strip. The conflicting requirements for incremental film advance from frame to frame, and constant speed of the sound track relative to the playback head, are difficult to resolve without elaborate apparatus.

One approach to this problem is to provide an incremental drive for film advance at the projection station, and a separate constant speed film drive at a remote playback station. The projection and playback stations are separated by a relatively large loop of film, and synchronized in some fashion so that the loop maintains the same constant average length, within the limits required to preserve lip synchronization between the sound track and the photographic scene. This approach obviously involves a relatively complex drive and synchronization system.

It would obviously be highly desirable to reduce the requirements for speed uniformity on signal reproducing systems of the kind described, and a primary object of the invention is to do so. A more particular object of the invention is to facilitate the production of sound motion pictures of the kind in which the sound track is recorded on the film strip.

Briefly, the above and other objects of the invention are attained by a novel signal reproduction system in which a compensator is included that derives frequency deviation information from a recorded pilot signal, and uses this information to correct the frequency of the reproduced information signal so that the original recorded signal is recreated. For this purpose, a pilot clock pulse train is derived from the recorded pilot signal. The clock pulse train so produced comprises pulses at intervals that may differ, but which represent equal time intervals in the original recording process. The clock pulse train is used to sample the reproduced information signal. The samples obtained are fed to a storage register.

A source of reference clock pulses is provided which consists of pulses at equal intervals that are in accordance with the intervals between the pilot clock pulses except for frequency shifts due to speed changes between recording and reproduction that appear as variations in the duration between pilot clock pulses. These reference clock pulses are used to gate samples out of the storage register to an output terminal.

On the output terminal appears a signal representing the contents of one location in the storage register until the next reference clock pulse, whereupon the signal is changed so as to equal the contents of the next storage location in the register. This output terminal is connected through a low pass filter to any desired utilization device, such as a loudspeaker or the like, where the originally recorded information is reproduced.

Samples may accumulate in, or be depleted from, the storage register as the input rate exceeds, or is less than, the output rate, respectively. There is a lower frequency limit for input frequency deviation, generally in the range of 0 to 1 cycles per second, beyond which it is impractical to provide enough storage locations in the memory for complete compensation. In accordance with the invention, three approaches may be taken to the solution of this problem.

First, a sampling rate high enough to be redundant is employed, and input or output samples are discarded or repeated from time to time as needed to stay within the capacity of the memory. Second, an electronic servomechanism may be employed to control the rate at which samples are taken from the memory so that the memory will not overflow or be emptied. This control is exercised at a rate slow enough to permit the maximum frequency compensation consistent with the capacity of the memory. Finally, if desired, a speed control mechanism for the apparatus that drives the record relative to the playback transducer can be employed, so that the input sampling rate can be controlled to reduce very low frequency wow errors.

The manner in which the apparatus of the invention is constructed, and its mode of operation, will best be understood in the light of the following detailed description, together with the accompanying drawings, of various illustrative embodiments thereof.

Figures 1, 2:
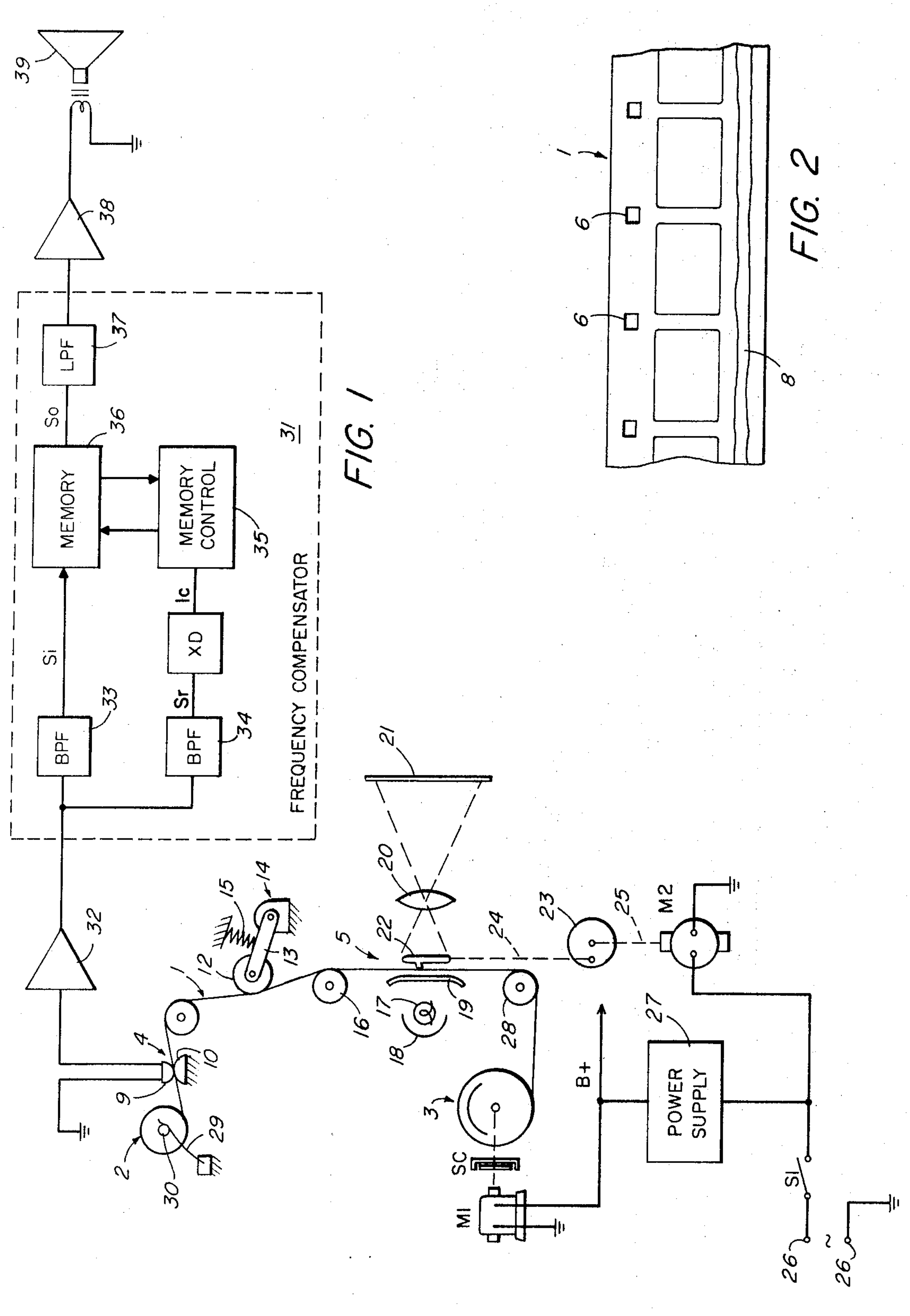
FIG. 1 is a schematic block and wiring diagram of a sound motion picture projection system in accordance with the invention.
FIG. 2 is a fragmentary elevational sketch, with parts broken away, showing schematically a sound motion picture film strip adapted for use in the system of FIG. 1.

Referring to FIG. 1, there is shown a motion picture projection system which may be of conventional construction except as specifically noted. In particular, a strip of motion picture film generally designated 1 is shown extending between a supply reel 2 and a take-up reel 3 over a path through a playback station generally designated 4 and a projection station generally designated 5.

Referring to FIG. 2, the film 1 is provided along at least one edge with a series of regularly spaced sprocket holes 6 that serve in a conventional manner to cooperate with incremental drive apparatus for allowing the film to be advanced a frame at a time past the projection station 5. On the film 1 are photographically recorded frames, each comprising a photographic transparency in a motion picture sequence, which frames are adapted to be viewed by intermittent projection in sequence.

Along at least one edge of the film 1 there is a strip of magnetic material generally designated 8, such as magnetic iron oxide or the like, on which a sound track can be recorded, preferably as the film is being exposed. Alternatively, the sound track can be photographically recorded, and reproduced by photoelectric means.

The sound track 8 cooperates with a conventional electromagnetic playback head 9, of the electromagnetic type for magnetic recording. The head 9 is arranged to engage the track 8 at the playback station 4, and to be urged into light engagement with the surface of the film 1 for that purpose by means schematically indicated as a resilient pressure pad 10.

The film 1 extends from the supply reel 2 through the playback station 4 just described, and thence over a first idler roll 11, and against a bobulator roller 12 journaled for rotation to a lever 13. The lever 13 is pivoted to the frame of the apparatus as suggested at 14, and is resiliently urged toward the film 1 by a spring 15.

As a frame of film is taken by the film drive pawl in a manner to be described, the spring 15 may be compressed to allow the film path to be momentarily shortened. Thus, the motion of the film past the playback station 4 can be relatively uniform.

The film 1 next passes around a fixed idler 16 rotatably mounted on the frame in the conventional manner, not shown, and thence past the projection station 5. At the projection station 5, conventional projection apparatus is provided comprising a lamp 17 provided with a reflector 18 arranged to direct a beam of light through a suitable framing aperture, not shown, in a conventional pressure plate 19. The pressure plate 19 serves to locate the focal plane of the film 1. Light transmitted through the film passes through a conventional lens system, schematically indicated at 20, onto any convenient viewing screen schematically shown at 21.

The film is arranged to be incrementally advanced past the projection station by a conventional film drive mechanism, schematically shown as comprising a drive pawl 22 connected to a crank 23 as suggested at 24. The crank 23 is arranged to be rotated by a shaft 25 driven by a conventional synchronous motor M2.

As the shaft 25 rotates the crank 23, the pawl 22 is reciprocated and oscillated in a conventional manner to engage one of the sprocket holes 6 and advance the film by one frame length, and then disengage the film and return to the position for the next feed stroke in engagement with the subsequent sprocket hole 6. This operation will be familiar to those familiar with motion picture projectors, and need not be further described.

The motor M2 is arranged to be supplied with alternating current from a pair of line terminals 26 when a switch S1 is closed. Closing the switch S1 also energizes a conventional power supply 27 to provide a DC potential B+ with respect to ground for various purposes to be described.

The take-up reel 3 for the film 1 is arranged to be driven by a motor M1 through a slip clutch SC. The motor M1 may be a conventional DC motor arranged to be supplied with drive current from the supply terminal at B+. The fixed speed of the motor M1 is selected to be in excess of the average speed of the film 1 produced by the intermittent reciprocation of the pawl 22.

The film 1 extends from the projection station 5 over a conventional snubber roll 28 to the take-up reel 3. Tension on the film 1 is provided by a brake, schematically indicated as a resilient arm 29 engaging the hub 30 of the supply reel 2, as well as by frictional components introduced at the playback station 4, by the idlers 11, 16 and the snubber roll 28, by the bobulator roller 12, and by the pressure plate 19 at the projection station. These components are designed to be sufficient that the slip clutch SC will normally slip, with the film 1 remaining stationary at the projection station 5, except when the pawl 22 advances the film and allows a frame to be taken by the supply reel.

The film 1 will thus be relatively continuously moved past the playback station 4 at a more or less uniform speed, and will be incrementally advanced at the projection station, with concommitant motion of the bobulator roll 12 to vary the film path length with these incremental film advance strokes so that the average speed at the playback station can be maintained. The film will be taken up on the tape-up reel 3 as it is advanced by the pawl 22.

It will be apparent that perfect isolation between the playback station and the projection station cannot be obtained by the mechanism just described. In particular, a strong flutter frequency component at the film projection rate, for example, from 18 to 24 cycles per second, will be introduced in this manner. Other wow and flutter components will also be present. These factors are removed by a frequency compensator 31 in a manner next to be described.

The playback head 9 is connected between ground and the active input terminal of a conventional preamplifier 32. The active output terminal of the amplifier 32 is connected in parallel to two band pass filters 33 and 34. The sound signal for the film may be recorded in a band from, for example, 100 Hz to 6,000 Hz for reasonably good fidelity. A pilot tone comprising a constant signal at 7,500 Hz may be recorded on the same track 8.

The filter 33 is arranged to pass the sound signals in the range from 100 to 6,000 Hz, and the filter 34 has a pass band sufficient to accommodate the 7,500 cycle pilot tone and its frequency deviations that may be introduced by wow and flutter, and particularly the strong component introduced by the intermittent motion of the film at the projection station 5.

The output signal from the filter 34, labeled Sr in FIG. 1, is supplied to a zero crossing detector XD, of any conventional construction, which preferably produces an output pulse at each zero crossing of the reference signal Sr, and accordingly produces a train of clock pulses IC at the rate of 15,000 per second. These clock pulses IC are applied to a memory control schematically indicated at 35 and to be described in more detail below.

The uncorrected audio signal Si from the band pass filter 33 is supplied to memory 36, shown in block form in FIG. 1, and to be described in more detail below. The memory control 35 directs the entry of samples of the signal Si into the memory 36 in time with the clock pulses IC, and produces an output signal So that is changed in time with a clock pulse train in a manner to be described. As the several stages of the memory are entered by the samples Si, they are taken out in sequence to sequentially determine the amplitude of the signal So.

Feedback from the memory 36 to the memory control 35 is provided, in a manner that will be described. Should the pulses IC that read samples into the memory be too much faster or too much slower in arriving than the internal clock pulses that take samples from the memory, this feedback control provides for the adjustment of the rates of the internal clock pulses so that the capacity of the memory will not be exceeded.

The output signal So from the memory is an analog signal that remains essentially constant between internal pulses and then changes to a new value at each such clock pulse. This signal is supplied through a low pass filter 37 to a conventional audio amplifier 38 that actuates a loudspeaker 39, or other desired utilization device.

If desired, a harmonic of the reference signal Sr may be used to generate the clock pulses. For example, following the band pass filter 34, a fifth harmonic selector could be incorporated to generate and selectively apply the fifth harmonic of the reference signal to the zero crossing detector XD. That would produce clock pulses IC at a considerably higher rate, and thus improve the fidelity of the output signal by increasing the sampling rate. A corresponding increase in the frequency of the oscillator, to be described, that produces the internal clock pulses would be necessary for this purpose.

The band pass filter 33 and 34 could be omitted, if desired. To permit that modification, the pilot signal and the information signal would be recorded on two separate tracks on the film, and two playback heads and preamplifiers would be required.

Figure 3:
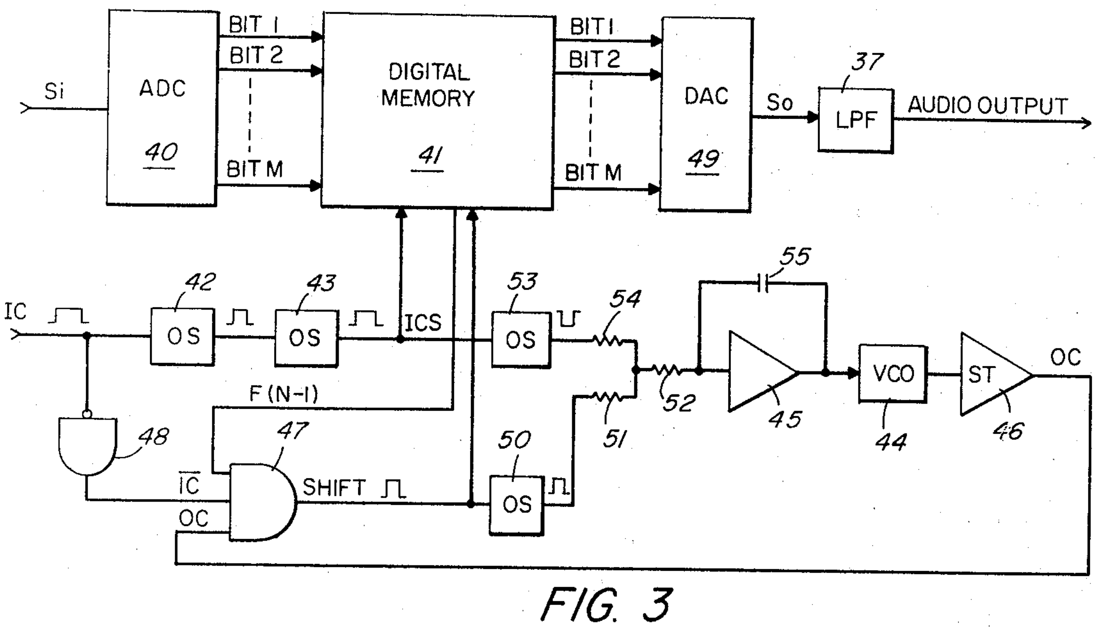
FIG. 3 is a schematic block and wiring diagram of a digital memory and memory control system suitable for use in the system of FIG. 1.

FIG. 3 shows a digital memory and its control circuits suitable for use in the compensator 31. As shown, the information signal Si is applied to a conventional analog-to-digital converter 40. The converter 40 transforms the analog input signal Si to an M-bit binary digital signal on M output leads labelled BIT 1 through BIT M.

The digital output signal from the converter 40 is applied to a storage location in a digital memory 41 that is selected in a manner to be described below in dependence on the number of samples stored in the memory 41. Each sample that enters the memory is entered in response to a gating pulse ICS.

One pulse ICS is produced during each input clock pulse IC. For this purpose, the pulses IC are applied to the trigger input terminal of a conventional one-shot multivibrator 42. At the leading edge of each pulse IC, the multivibrator 42 is triggered to produce a brief output pulse.

The trailing edge of each pulse from the multivibrator 42 triggers a conventional one-shot multivibrator 43 to produce a pulse ICS. The total duration of the pulse ICS and the pulse from the multivibrator 42 is less than the duration of each pulse IC. The result is that each pulse IC is present before, during and after the corresponding pulse ICS. The purpose of that provision is to inhibit a change in the locations of the samples stored in the memory 41 while a new sample is being loaded, as will appear.

A conventional voltage controlled oscillator 44 produces an output signal at a frequency varying about a predetermined center frequency in accordance with the output signal from an integrating amplifier 45, to be described. The output signal from the oscillator 44 is applied to a conventional pulse generator, here shown as a Schmitt trigger 46, to produce a train of clock pulses OC. The pulses OC have a repetition rate, at the center frequency of the oscillator VCO, in the neighborhood of the repetition rate of the pulses IC in the absence of wow and flutter.

The pulses OC are applied to one input terminal of a conventional AND gate 47, a second input terminal of the gate 47 receives a signal $\overline{IC}$ produced by a conventional NAND gate 48. The gate 48 receives the pulses IC and inverts them to produce the logic 1 signal $\overline{IC}$ when no pulse IC is present. A third input terminal of the gate 47 receives a signal F(N−1) produced at logic 1 in a manner to be described when there are at least two samples stored in the digital memory 41.

The pulses OC are made slightly shorter than the pulses IC, and preferably of the same duration as the pulses ICS. The gate 47 will thus produce an output pulse, labelled SHIFT, when F2 is present, at each pulse OC unless a pulse IC is essentially simultaneous with the pulse OC. If there is some overlap, a SHIFT pulse will be produced just before, or just after, the pulse IC, with a minimum time separation that is determined by the duration of the pulse from the multivibrator 42 and the interval between the trailing edge of the pulse ICS and the trailing edge of the pulse IC. This interval is made sufficient to assure proper operation of the memory 41. In the rare event that a SHIFT pulse is inhibited by a coincident pulse IC, an output sample will simply be repeated, as though there had been a temporary drop in playback speed.

The SHIFT pulses are used to shift the contents of the memory by one storage location for each pulse. The contents of the memory are thus successively shifted to advance the samples entered by the pulses ICS to an output storage register in the memory, to be described, which has M output terminals on which a digital signal corresponding to the contents of the output storage register appears. This signal is applied to a conventional digital-to-analog converter 49.

The converter 49 produces an analog signal in accordance with the value of the current digital signal applied to it. This analog signal is applied to the low pass filter 37 to produce the compensated audio output signal.

The SHIFT pulses are applied to a one-shot multivibrator 50 to produce a positive pulse having a relatively long duration, but less than the minimum interval between SHIFT pulses, for each SHIFT pulse. These pulses are applied through a summing resistor 51 and a resistor 52 to the input terminal of the amplifier 45. The pulses ICS are applied to a one-shot multivibrator 53 to produce a negative pulse equal in duration to the pulse from the multivibrator 50 for each pulse ICS. These pulses are applied to the input terminal of the amplifier 45 through a summing resistor 54 and the resistor 52.

The amplifier 45 has a capacitor 55 degeneratively connected between its active input and output terminals so that it serves as an integrator with a time constant determined by the resistors 51, 52 and 54 and the capacitor 55. This time constant is selected in dependence on the time required to fill the memory 41 so that a gradual adjustment of the frequency of the oscillator 44 is effected that will track low frequency wow errors and yet allow the number of samples in the memory to fluctuate in response to higher frequency wow and flutter shifts in frequency.

Figure 4:
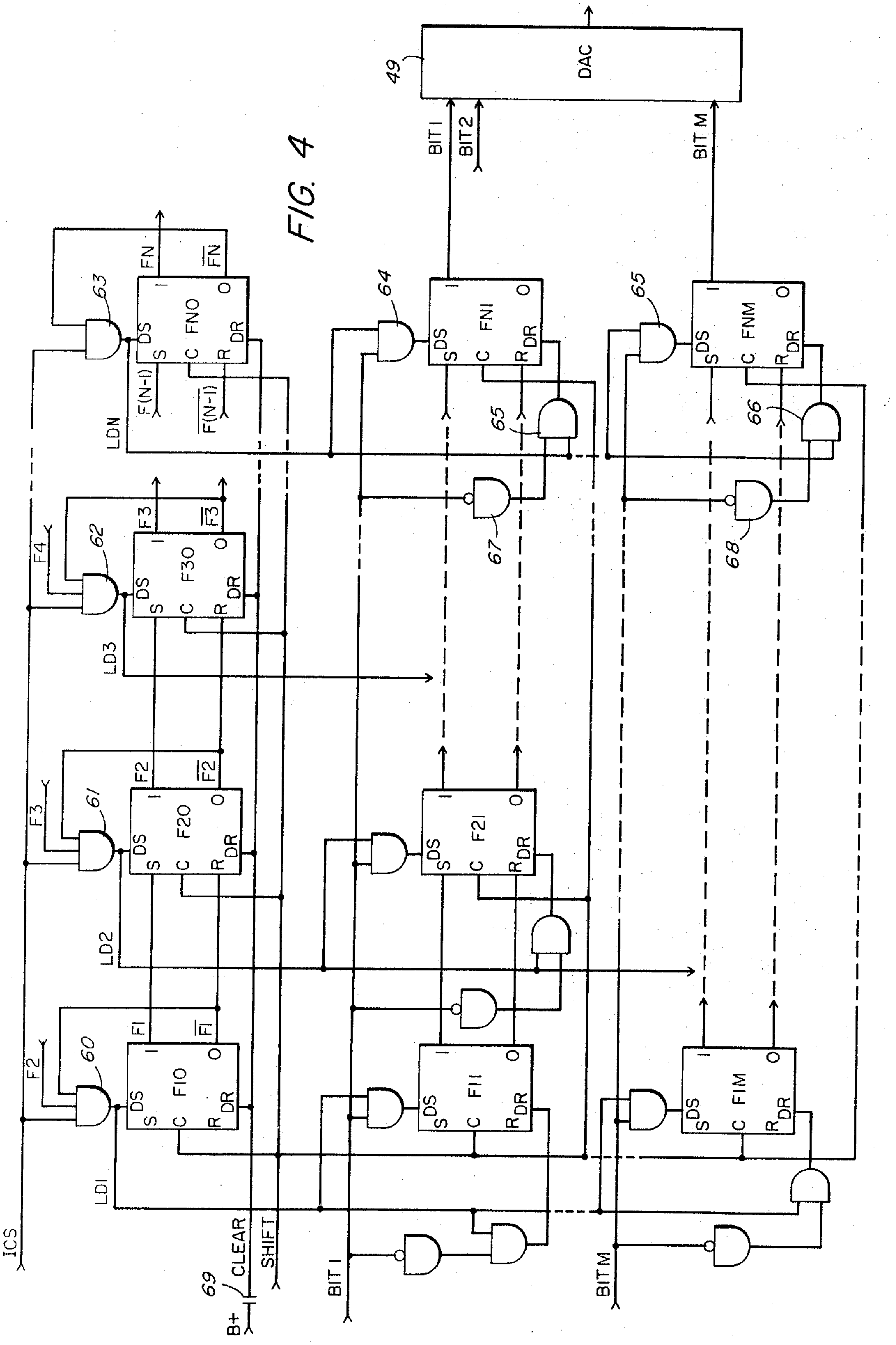
FIG. 4 is a schematic block and wiring diagram showing further details of the memory, and a memory control system of FIG. 3.

FIG. 4 shows the details of the digital memory 41 in representative part. The memory comprises a set of N conventional synchronous flip-flops for each of the M bits of the digital signal from the converter 40, and an address tracking set of N flip-flops that each store a logic 1 signal when an associated bank of information storage flip-flops contains a stored sample. The arrangement, to be described, is such that a new sample is stored in the first available storage bank nearest the output storage bank at each pulse ICS, and the contents of the memory are shifted one bank toward the output register at each SHIFT pulse.

Each of the flip-flops is of the conventional type which have a set terminal S, a reset terminal R, a trigger input terminal C, a direct set terminal DS, and a direct reset terminal DR. In response to a clock pulse transition applied to the trigger input terminal C and a logic 1 level present at the set terminal S for a predetermined interval prior to the clock pulse transition, the flip-flop is set to produce a logic 1 level at its logic 1 output terminal and a logic 0 level at its logic 0 output terminal. In response to a pulse transition applied to the terminal C and a logic 1 level at the terminal R, the flip-flop will be reset to a state in which there is a logic 1 level at the output terminal 0 and a logic 0 level at the output terminal 1. In response to a positive pulse applied to the terminal DS, the flip-flop will be set without requiring a clock pulse transition. Similarly, a logic 1 pulse at the terminal DR will directly reset the flip-flop.

N flip-flops F10, F20 through FN0 respond to the pulses ICS to register the locations of samples in the memory. For this purpose, the pulses ICS are applied to one input terminal of N conventional AND gates such as the gates 60, 61 and 62 for the flip-flops F10, F20 and F30, and the gate 63 for the flip-flop FN0.

A second input terminal of each of the gates such as 60, except for the last gate 63, receives a signal that is at logic 1 when the next higher ordered flip-flop is set. Thus, the gate 60 receives a signal F2 from the logic 1 output terminal of the flip-flop F20, the gate 61 receives a signal F3 from the logic 1 output terminal of the flip-flop F30, and so on.

A third input terminal of each of the gates such as 60 is connected to the logic 0 output terminal of the associated flip-flop. Thus, the gate 60 receives the signal $\overline{F10}$, the gate 61 receives the signal $\overline{F20}$, and so on.

The output terminal of each of the gates such as 60 is connected to the direct set terminal DS of the corresponding flip-flop. Each gate will produce a logic 1 output signal to set the corresponding flip-flop when a pulse ICS appears, the flip-flop is reset, and, except in the case of the flip-flop FNO, when the next highest ordered flip-flop is set. Thus, for example, the flip-flop F20 will be set when it is reset, the flip-flop F30 is set, and a pulse ICS appears.

The output signals from the gates such as 60 are used to control the entry of samples into N banks of flip-flops each associated with a different one of the flip-flops F10 through FNO. Each bank comprises one flip-flop for each bit in an M bit signal representing a sample. The first such bank, associated with the flip-flop F10 and the gate 60, comprises the flip-flops F11 through F1M. Similarly, the second bank comprises flip-flops F10 through F2M, of which only F10 and F20 are shown. The output storage bank comprises the flip-flops FNO through FNM. As shown, the logic 1 output terminals of the output bank are connected to the input terminals of the digital-to-analog converter 49.

When the memory is empty, all of the flip-flops F10 through FNO are reset. The gate 63 is thus enabled to set the flip-flop FNO when a pulse ICS is received. The logic 1 output signal LDN from the gate 63 that sets the flip-flop FNO enables an AND gate, such as the gates 64 and 65, for each of the flip-flops FN1 through FNM of the output storage bank. Each of these gates such as 64 and 65 has an output terminal connected to the DS input terminal of the corresponding flip-flop.

A second input terminal of each of the gates such as 64 and 65 is connected to a different one of the M data input leads. Thus, if the associated bit, such as BIT 1, is at logic 1, the gate such as 64 will set the associated flip-flop such as FN1.

A second set of AND gates such as the gates 65 and 66 each has an output terminal connected to the direct reset input terminal DR of a different one of the flip-flops FN1 through FNM. The gates such as 65 and 66 are all enabled by the signal LDN applied to one input terminal.

A second input terminal of the gates such as 65 and 66 is connected to the output terminal of a different one of a set of NAND gates such as the gates 67 and 68, serving as inverters. Each of the gates such as 67 and 68 has an input terminal connected to a different one of the M input signal leads on which the signals BIT 1 through BIT M appear. Thus, if one of these bits is at logic 0 when the signal LDM appears, the corresponding flip-flop FN1 through FNM will be reset.

The other storage banks are similarly connected to be loaded from the data input lines on which the signals BIT 1 through BIT M appear when the corresponding signal LD1, LD2, etc., is produced by the corresponding gate such as 60, 61 and 62.

The flip-flop sets F10 through FN0, F11 through FN1, etc., are each connected as shift registers. For this purpose, all of the flip-flops have their trigger input terminals C connected to a common lead on which the SHIFT pulse appears. In each such set, the logic 1 output terminals of each flip-flop except the last is connected to the input terminal S of the next highest ordered flip-flop in the set. Similarly, the logic 0 output terminal of each flip-flop but the last is connected to the input terminal R of the next highest ordered flip-flop. For example, the output terminals of the flip-flop F20 are connected to the input terminals S and R of the flip-flop F30, the output terminals of the flip-flop F11 are connected to the input terminals S and R of the flip-flop F21, and so on.

Thus, when a SHIFT pulse is produced, the contents of each bank except the output bank is transferred to the next highest ordered bank. The contents of the output bank are discarded.

The direct reset input terminals DR of the memory contents register comprising the flip-flops F10 through FN0 are connected through a capacitor 69 to the supply terminal at B+. Thus, when the power supply 27 is first turned on by closing the switch S1 (FIG. 1), a CLEAR pulse is applied to these flip-flops to reset them all, thereby conditioning the flip-flop FN0 to be set, and the first data signal to be loaded into the output storage bank when the first pulse ICS is produced.

Subsequent data signals are loaded into the next available banks N−1, N−2 . . . .3, 2 and 1, respectively. The last two banks, N and N−1, must be loaded before a SHIFT pulse can be produced, since the signal F(N−1) must be present to enable the AND gate 47 in FIG. 3. This signal is produced by a flip-flop F(N−1)0, not shown in FIG. 4, which immediately precedes the flip-flop FN0 in the memory contents register. Thereafter, the memory can be augmented or depleted, depending on the playback speed relative to the recording speed.

Should the memory be loaded to capacity, with a sample stored in the input bank F11 through F1M, another pulse ICS occurring before a SHIFT pulse would not be able to load a new sample, and that sample will be discarded. How frequency that will occur depends on the time constant of the servomechanism comprising the oscillator 44 and the integrating amplifier 45, the number of storage locations in the memory, and the sampling rate. These should be chosen so that the frequency of occurrence of dropped samples at the input, or repeated samples at the output, does not appreciably affect the quality of the output signal. For example, at the sampling rate of 15,000 per second, a sixteen stage memory will produce highly acceptable sound quality from 18 frame per second sound motion picture film.

The number of storage locations required in the memory may be approximated from the following considerations.

Let W be the bandwidth of the audio signal to be compensated. Then 2W is the minimum sampling frequency at which all of the information in the audio signal can be conserved. In the practice of the invention, a sampling rate of at least 2W should be employed.

The arrival rate of samples at the memory input is $R_{(t)}$, where $t$ is time. $R_{(t)} = Ro + r(t)$, where $Ro = SW$ and $S$ is at least 2. The function $r(t)$ may be expressed, for present purposes, as $r(t) = Ro(1 - N_2/N_1) \sin 2\pi$ ft, $N_2$ is the instantaneous playback speed, $N_1$ is the corresponding recording speed, $Ro(1 - N_2/N_1)$ is the flutter amplitude (in Hz, for example), and $f$ is the flutter frequency. One half cycle of flutter at the frequency $f$ will thus produce the maximum number of excess samples that must be stored in order to gate samples out at the rate $Ro$ and thus restore the information signal to its initial frequency. This excess $E$ is given by:

$$E = Ro\left(1-\frac{N_2}{N_1}\right)\int_0^{\frac{1}{2f}} \sin 2\pi ftdt \frac{Ro}{\pi f}\left(1-\frac{N_2}{N_1}\right)$$

According to this formula, the amount of memory required increases with higher sampling rates and flutter amplitude, and decreases with higher flutter frequency and better speed control. As a specific example, if the sampling rate is 15,000 samples per second and the flutter frequency is 18 Hz, a five stage memory would correct for maximum speed deviation of about 1.9 percent between recording and playback.

Figure 5:
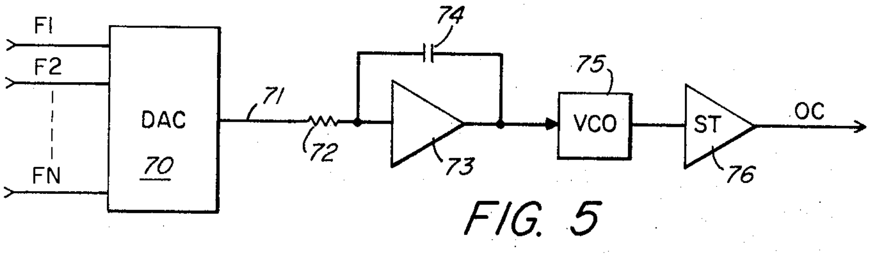
FIG. 5 is a schematic block and wiring diagram of a modification of a control circuit shown in FIG. 3.

FIG. 5 shows a modified form of servo control for the voltage controlled oscillator which determines the repetition rate of the clock pulses OC. As shown, the signals F1 through FN from the logic 1 output terminals of the memory contents register flip-flops F10 through FN0 in FIG. 4 are connected to a conventional digital-to-analog converter 70 to produce an analog signal on a lead 71 which varies about a central value when half of the memory is loaded to higher and lower values when more or less than half of the memory is loaded, respectively. This signal is supplied through a resistor 72 to the input terminal of an amplifier 73 that has a capacitor 74 degeneratively connected between its active input and output terminals. The time constant of the integrator so formed is selected to operate in the lower range of flutter frequencies, i.e., from 0 to 1 Hz, to vary the frequency of a voltage controlled oscillator 75.

The output signal from the oscillator 75 is applied to a conventional Schmitt trigger circuit 76 to produce clock pulses OC, used in the manner described above, at a rate dependent on the adjusted frequency of the oscillator 75. The frequency of the oscillator 75 is varied by the integrator comprising the amplifier 73 about a center frequency at which the rate of the pulses OC equals the rate of the pulses IC in the absence of wow and flutter.

Figure 6:
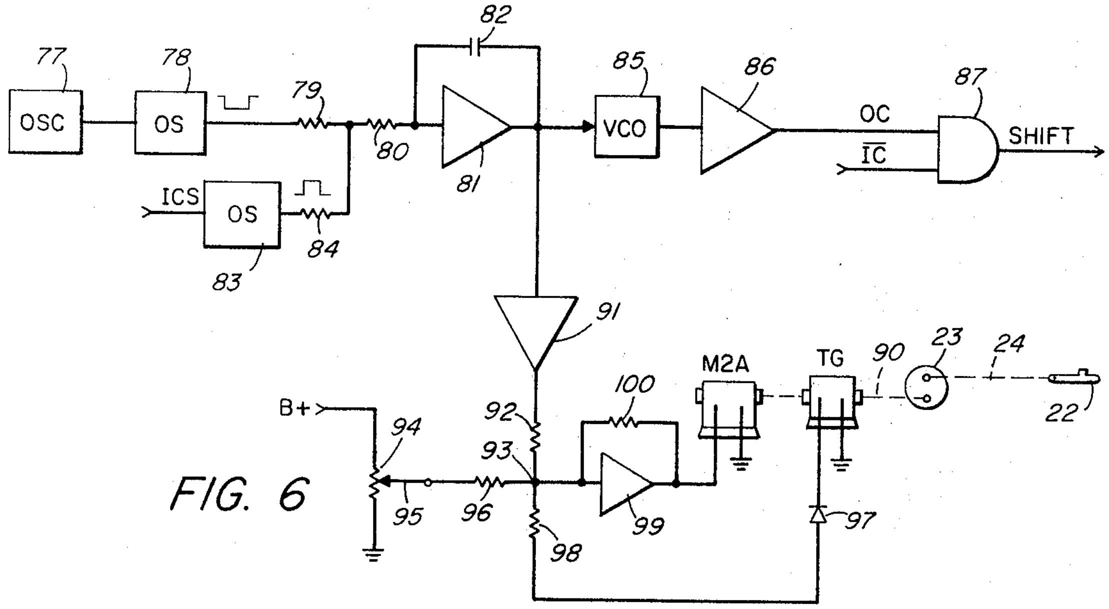
FIG. 6 is a schematic block and wiring diagram illustrating a modification of a portion of the apparatus of FIGS. 1 and 3.

FIG. 6 shows a further modification, and an extension, of the servomechanism that controls the rate at which samples are stored in and removed from the memory to prevent the loss or repetition of samples. Specifically, a local oscillator 77 is arranged to operate at a fixed frequency corresponding to the recorded pilot frequency. The output signal from the oscillator 77 is applied to a one-shot multivibrator 78 to produce a train of clock pulses at fixed intervals equal to the zero-flutter rate of the pulses ICS, produced as described above.

The pulses from the multivibrator 78 are preferably of a duration somewhat less than the minimum interval between the pulses ICS under the most extreme flutter condition to be encountered. These pulses are applied through a summing resistor 79 and an input resistor 80 to the input terminal of an amplifier 81 that has a feedback capacitor 82.

The pulses ICS are applied to a one-shot multivibrator 83 to produce pulses, one for each pulse ICS, having a duration equal to that of the pulses from the multivibrator 78 and of opposite polarity. These pulses are applied through a summing resistor 84 and the resistor 80 to the input terminal of the amplifier 81. The time constant of the integrator so formed is determined in the manner described above in connection with the integrator comprising the amplifier 45 in FIG. 3.

The output signal from the integrating amplifier 81 is applied to the control terminal of a voltage controlled oscillator 85. The output signal from the oscillator 85 is applied to a Schmitt trigger 86 to cause a train of clock pulses OC to be produced for the purposes described above. These pulses are applied to one input terminal of an AND gate 87.

A second input terminal of the gate 87 receives the signal $\overline{IC}$, produced as described above. The gate 87 thus produces a train of SHIFT pulses, used as described above. These pulses are produced at a controlled rate that reduces the tendency for the memory to overflow, or repeat, in response to low frequency flutter or wow errors.

Since the signal at the output terminal of the amplifier 81 is referenced to the recording speed by the fixed frequency of the oscillator 77, it may be used, if desired, to adjust the average film projection speed to the recording speed. For that purpose, the synchronous motor M2 in FIG. 1 may be replaced by a DC motor M2A having an output shaft 90 that drives the crank 23 to oscillate the shaft 24 and thereby drive the pawl 22. A tachometer generator TG may also be driven by the shaft 90, if so desired, to produce a signal in accordance with the speed of the shaft 90.

The output signal from the amplifier 81 is applied to the input terminal of a conventional amplifier 91. The amplifier 91 produces an output signal that is bipolar and properly scaled to vary the speed of the motor M2A about a reference speed in the proper sense to make the average repetition rates of the pulses from the multivibrator 78 and 83 equal over a period equal to a low flutter frequency of, for example, 2 cycles per second.

The output signal from the amplifier 91 is applied through a summing resistor 92 to a summing junction 93. A reference signal for establishing the nominal speed of the motor M2A is provided by a potentiometer comprising a resistive element 94 connected between the supply terminal at B+ and ground. The potentiometer has an adjustable wiper 95 connected through a summing resistor 96 to the summing junction 93.

The signal from the tachometer generator TG is rectified by a diode 97 and applied through a summing resistor 98 to the summing junction 93. The summing junction 93 is connected to the input terminal of an amplifier 99 having a degenerative feedback resistor 100. The output signal from the amplifier 99 is connected to the motor M2A, to cause it to run at an average speed that will advance the film at the same rate that it was advanced during exposure and recording.

Modification of the system of the invention in accordance with FIG. 6 effects corrections at three levels. First, the accumulation or depletion of samples in the memory corrects for flutter to the degree permitted by the capacity of the memory. This correction directly improves the fidelity of the signal.

Second, the controlled oscillator 85 varies the output sampling rate to prevent the memory from overflowing or repeating samples in the presence of very low frequency wow errors and speed offsets between recording and playback. This action does not in itself effect any correction, but rather makes it possible for the memory to correct flutter to the maximum degree permitted by its capacity. To the extent that the oscillator's action is imposed, it allows very low frequency flutter to be reproduced in the output.

Finally, controlling the speed of the projection drive motor M2A corrects for very low frequency wow errors and speed offsets between recording and playback. This correction also directly effects an improvement in the fidelity of the output signal.

The three foregoing elements, memory, output oscillator control, and motor control operate cooperatively to reduce or eliminate wow and flutter over the whole spectrum at which it can occur.

Figure 7:
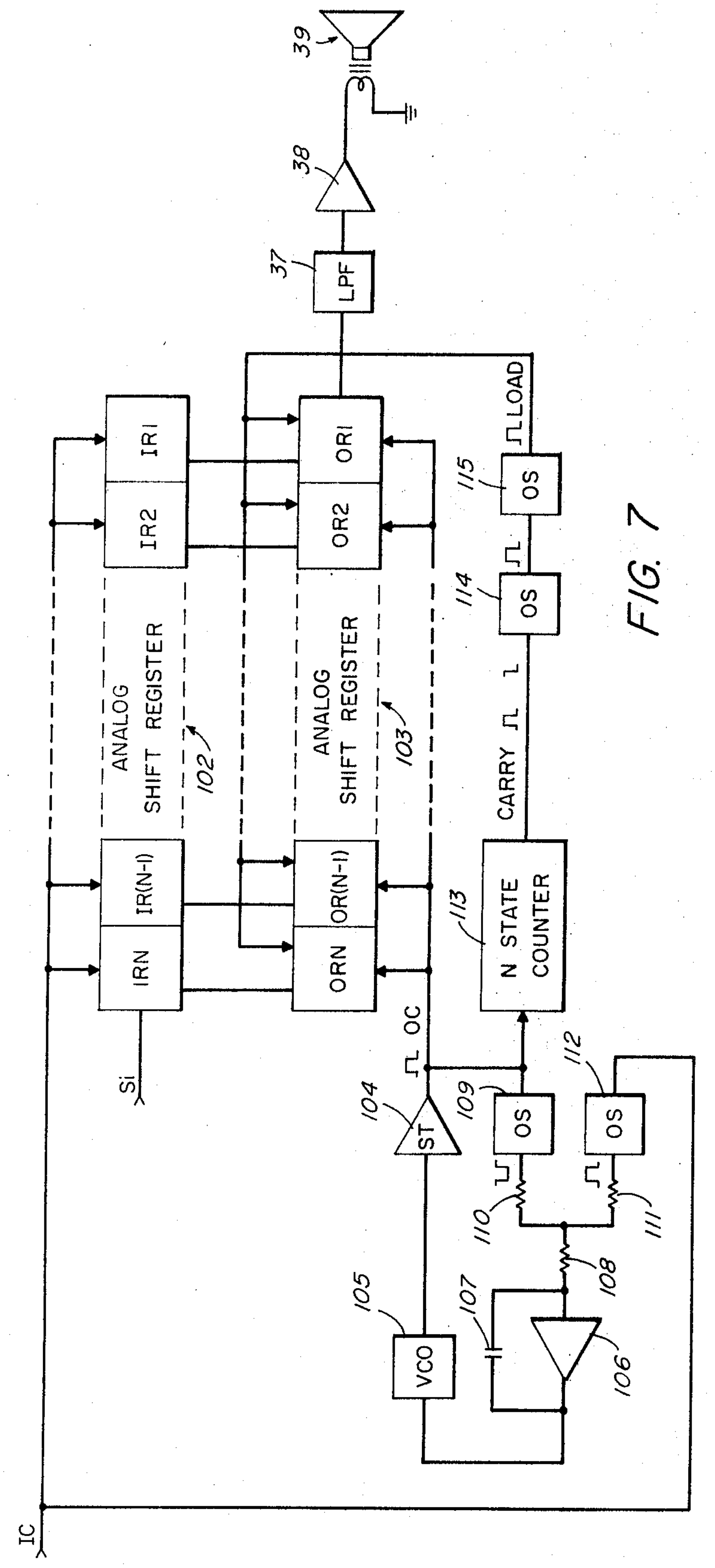
FIG. 7 is a schematic block and wiring diagram of an analog memory and memory control system suitable for use in the system of FIG. 1.

FIG. 7 shows a modification of the system of the invention in which an analog memory is employed. The apparatus comprises a first analog shift register 102, into which analog samples of the signal SI are gated by pulses IC produced as described above. The shift register 102 has N stages IR1 through IRN, to be described, each of which essentially comprises two sample-and-hold circuits connected in series. At each pulse IC, a new sample is taken into the stage IRN, the contents of the stage IR1 are discarded, and the contents of the stages IR2 through IRN are shifted one stage to the right.

A second analog shift register 103 is provided. The register 103 also has N stages, OR1 through ORN. Each of the stages OR1 through ORN is loaded with the contents of a different stage of the register 102 when a LOAD pulse is produced in a manner to be described.

The contents of the registers OR2 through ORN are shifted one stage to the right, and the contents of the register OR1 are discarded, when a clock pulse OC is applied to the register 103. The pulses OC are produced by a Schmitt trigger 104 in response to the output signal from a voltage controlled oscillator 105 in the manner described above.

The oscillator 105 is controlled by an integrator comprising an amplifier 106 having a feedback capacitor 107 and an input resistor 108. A negative pulse is applied to the integrator from a one-shot multivibrator 109, through a summing resistor 110, in response to each clock pulse OC. A positive pulse is supplied through a summing resistor 111 from a one-shot multivibrator 112 in response to each pulse IC. These pulses function in the manner described above to slowly adjust the rate of the pulses OC to the average rate of the pulses IC to prevent the loss or repetition of too many samples.

The clock pulses OC are applied to the input terminal of a conventional N state binary counter 113. The counter 113 produces an output CARRY pulse for each N pulses OC.

The trailing edge of each CARRY pulse triggers a one-shot multivibrator 114 to produce an output pulse of sufficient duration to allow the contents of the register 103 to settle. The trailing edge of this pulse triggers a one-shot multivibrator 115 to produce the LOAD pulse that transfers the contents of the register 102 to the register 103.

The output stage OR1 of the register 103 is connected through the low pass filter 37 to the amplifier 38 that supplies an audio output signal to the speaker 39 in the system of FIG. 1. The signal applied to the filter 37 is changed each time a clock pulse OC is produced. As will appear, that may result in the repetition of a sampled value, should the rate of the pulses IC fall below the rate of the pulses OC for a sufficient time interval, unless corrected by the oscillator 105. The apparatus is most effective if that is allowed to happen occasionally, but not too frequently to affect the quality of the output signal, by properly selecting the time constant of the integrator that controls the oscillator 105 as a function of the number of stages in the registers 102 and 103.

It will be apparent that the register 102 will be fully loaded as soon as N pulses IC have been applied to it, and that it will not become empty no matter how slowly the pulses IC arrive. If the pulses IC arrive rapidly enough, samples may be shifted out of the register IR1 before they are loaded into the register OR1, but that result is contemplated so long as it does not occur too frequently. Similarly, as soon as N pulses OC have been produced, after N pulses IC have occurred, the register 103 will be loaded, and it will remain fully loaded thereafter, because each time its contents are shifted N times, the register 103 will almost immediately be reloaded from the register 102.

Figure 8:
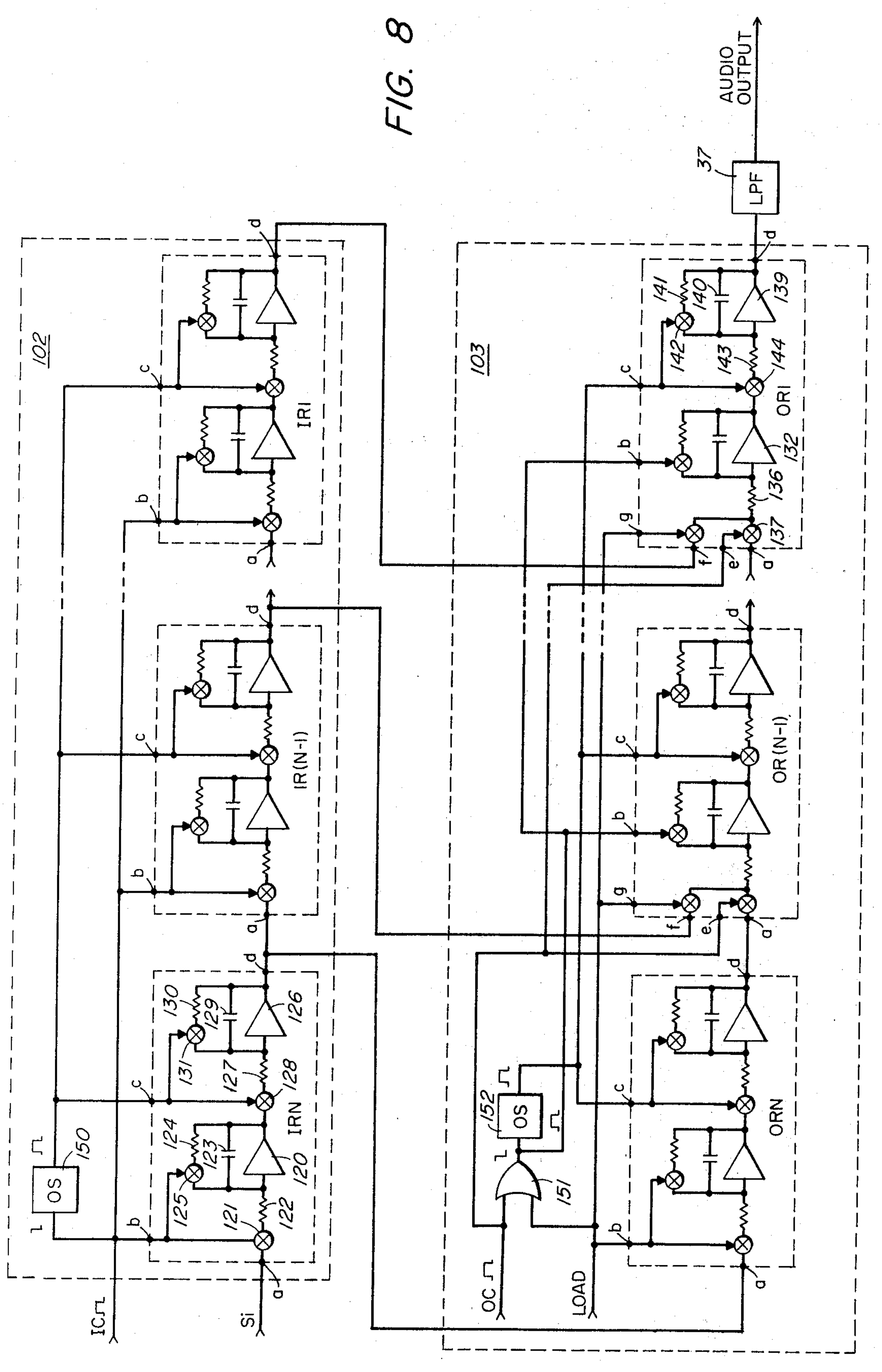
FIG. 8 is a schematic block and wiring diagram showing further details of the analog memory of FIG. 7.

FIG. 8 shows the details of the registers 102 and 103. Only typical stages of each register are shown in detail, as the remaining registers are each identical with one of those shown.

In particular, the register stages IR1 through IRN and ORN may be identical, and the register stages OR1 through OR(N–1) may be identical. Typical register stages IRN and OR1 will next be described.

The stage IRN comprises two identical sample-and-hold circuits connected in series. The first such circuit comprises an amplifier 120 having an input circuit path from an input terminal *a* through the load terminals of a conventional electronic switch 121 and a resistor 122.

A degenerative feedback network is provided between the active output and input terminals of the amplifier 120. This network comprises a capacitor 123 in parallel with the series combination of a resistor 124 and the load terminals of a conventional electronic switch 125.

The electronic switches 121 and 125 may be of any conventional type, such as transistors or the like. Each switch has a control terminal distinguished by an arrowhead. When a logic 1 signal, assumed to be positive with respect to ground, is applied to this control terminal, the switch is closed, and when a logic 0 signal, such as ground potential, is applied to the control terminal, the switch is open.

The control terminals of the switches 121 and 125 are connected together to an input terminal *b*. When a logic 1 signal is applied to this input terminal *b*, both switches are closed and the amplifier rapidly produces an output signal that is proportional to the amplitude of an analog signal applied to the input terminal *a*. A voltage equal to the output signal is stored by the capacitor 123, and remains to keep the output signal essentially constant after the switches 121 and 123 are opened.

If the resistors 122 and 124 have resistances R1 and R2, respectively, the capacitor 123 has a capacitance C, and the amplifier 120 has an internal gain A and an input resistance Ri when the switches 121 and 125 are open, the time constants T1 for storage of a sample, and T2 for discharge of the capacitor 123 in the holding state, are given by:

$$T1 = R_2C$$

$$T2 = AR_iC.$$

The output voltage $e_0$ that will be produced by the amplifier 120 in response to a voltage $e_1$ applied to the input terminal *a*, assuming $e_1$ to be substantially constant over the sampling interval, is given by:

$$e_0 = (R_2/R_1)\, e_1.$$

It will be apparent from these considerations that the sampling time can be very short compared to the holding time with readily attainable values of the constants. And the output signal is independent of the capacitance of the capacitor 123. Thus, the circuit is amenable to construction by conventional integrated circuit techniques.

A second sample-and-hold circuit in the stage IRN comprises an amplifier 126 having an input terminal connected to the output terminal of the amplifier 120 through a resistor 127 and the load terminals of an electronic switch 128. A storage capacitor 129 is connected between the input and output terminals of the amplifier 126. A resistor 130 and the load terminals of an electronic switch 131 are connected in series across the capacitor 129.

The control terminals of the switches 128 and 131 are connected together and to an input terminal *c* of the stage IRN. Thus, the switches are closed to sample the output signal from the amplifier 120 when a positive pulse is applied to the terminal *c*.

If the values of the resistors 127 and 130 are R3 and R4, respectively, the output signal $e_o$ produced at the output terminal *d* of the stage IRN when an input signal $e_1$ is applied to terminal *a*, the switches 121 and 123 have been closed and opened, and the switches 128 and 131 have subsequently been closed and opened, is given by:

$$e_o = (R_2R_4e_1/\, R_1R_3).$$

The individual factors $R_2/R_1$ and $R_4/R_3$ are not particularly critical, although it is desirable to have $R_2R_4/R_1R_3$ near 1 to avoid progressive increases or decreases in level as the samples progress through the register stages. It is desirable to have the gains of each of the IR stages equal to the gains of the correspondingly numbered OR stage. Each sample that appears in the output signal, except for an occasional repeated sample, passes through the same number of register stages, but a sample may pass from the input stage IRN of the register 102 to the output stage of the register 103 by a variety of routes.

For example, a sample may be taken into the stage IRN and immediately be transferred to the stage ORN, or it may first be shifted into any other stage of the register 102 and then be transferred to the correspondingly numbered OR stage. All such routes should have nearly enough the same overall gain to avoid amplitude modulation of the output signal. That can be accomplished, for example, by making an integrated circuit that can serve as either the register 102 or the register 103 with appropriate external terminal connections, so that the characteristics of each stage will be reproducible even though the parameters may vary somewhat from stage to stage.

The register stages such as OR1 are essentially the same as the stages such as IRN, except that an additional electronic switch is provided so that samples may be taken from two sources, and that the switch control circuits are modified. Specifically, the typical stage OR1 has a first sample-and-hold circuit comprising an amplifier 132. A storage capacitor 133 is connected between the input and output terminals of the amplifier 132. A sampling resistor 134 is connected in series with an electronic switch 141 between the input and output terminals of the amplifier 132.

The input terminal of the amplifier 132 is connected to a first sampling input terminal *a* through a resistor 136 and an electronic switch 137. The input terminal of the amplifier 132 is connected to a second sampling input terminal *f* through the resistor 136 and an electronic switch 138. The control terminals of the switches 135, 137 and 138 are connected to independent input terminals *h*, *e* and *g*, respectively, for purposes to be described, such that each switch is closed when a positive pulse is applied to the corresponding input terminal.

The stage OR1 comprises a second sample-and-hold circuit including an amplifier 139 connected to a storage capacitor 140, a sampling resistor 141, an electronic switch 142, and an input resistor 143 in the manner of the previously described circuits. The control terminals of the switches 142 and 143 are connected together and to an input terminal *c*.

The stage OR1 is arranged to operate in two modes. To take a sample from the next OR stage OR2, the switches 137 and 135 are simultaneously closed and then opened, to store a sample on the capacitor 133. The switches 142 and 143 are then simultaneously closed and then opened, to store the sample on the capacitor 140. To take a sample from the corresponding IR stage IR1, the switches 138 and 135 are simultaneously closed and then opened. The sample is then transferred to the capacitor 140 as before.

The analog input signal Si is applied to the input terminal *a* of the stage IRN. The pulses IC are applied to the input terminals *b* of each of the stages IR1 through IRN, and to the trigger input terminal of a one-shot multivibrator 150.

The trailing edge of each pulse IC triggers the multivibrator 150 to produce an output pulse that is applied to the input terminals *c* of each of the register stages IR1 through IRN. Thus, each time a pulse IC is produced, a new sample is stored on the capacitor 123, and then transferred to the capacitor 129. It should be noted that such a transfer does not result in the loss of the charge stored on the capacitor 123, which remains essentially unchanged until the next sample is taken.

As each new sample is taken into the stage IRN by a pulse IC, each of the registers IR1 through IR(N−1) stores the contents of the next higher ordered IR stage. Thus, for example, when the pulse IC is produced, it transfers a sample to the first sample-and-hold circuit in the stage IR(N−1) from the output terminal *d* of the stage IRN. When the pulse from the multivibrator 150 is produced, that sample is transferred to the second sample-and-hold circuit in the stage IR(N−1).

The input terminal *a* of the stage ORN is connected to the output terminal *d* of the stage IRN. For the same purpose, the input terminals *f* of each of the stages OR1 through OR(N−1) are each connected to the output terminal *d* of the correspondingly numbered stage IR1 through IR(N−1).

The LOAD pulses are applied to the input terminal *b* of the stage ORN, and to the input terminals *g* of each of the stages OR1 through OR(N−1). The LOAD pulses are also applied to one input terminal of an OR gate 151.

The clock pulses OC are applied to the input terminals *e* of each of the stages OR1 through OR(N−1). The pulses OC are also applied to a second input terminal of the gate 151.

At the trailing edge of either a LOAD pulse or an OC pulse, the gate 151 triggers a one-shot multivibrator 152 to produce an output pulse. The pulses from the multivibrator 152 are applied to the input terminals *c* of each of the stages OR1 through ORN.

The output signal at terminal *d* of the stage OR1 is applied to the low pass filter 37 described above. This signal is thus changed each time the contents of the last stage OR1 is changed.

At each pulse OC, each of the stages OR1 through OR(N−1) copies the contents of the next highest ordered OR stage into its input sample-and-hold circuit. At the end of this pulse OC, the multivibrator 152 transfers this signal to the second sample-and-hold circuit in each stage. The multivibrator 152 also causes the second sample-and-hold circuit of the register ORN to recopy the sample stored by the first, which has not been changed. That does not affect the operation of the apparatus, and is done to simplify the wiring by avoiding a separate control circuit for the input terminal *c* of the stage ORN.

After N pulses OC have been produced, a LOAD pulse is produced as described above. This pulse copies the contents of each of the stages IR1 through IRN into the correspondingly numbered stage of the register 103. At the trailing edge of each such LOAD pulse, the multivibrator 152 produces a pulse to shift these samples into the second sample-and-hold circuit in each stage.

The operation of the embodiment of FIG. 8 will be generally apparent from the above description. However, operation under various typical conditions will be briefly described.

First, assume that the reproduced signal Si is either not fluttering with respect to the recorded signal, or is fluttering in such a way that N pulses OC and N pulses IC have been produced. There are thus N samples S1 through Sn in the stages IR1 through IRN, respectively, and not yet any meaningful information in the register 103.

Following the Nth pulse OC, a LOAD pulse will be produced. That will cause the contents of the register 102 to be copied into the register 103. The contents of the register 102 will remain the same, and the samples S1 through Sn are now also stored in the registers OR1 through ORN, respectively. The output signal at terminal *d* of the stage OR1 now has the value S1.

Assume that (N−1) pulses OC and an equal number of pulses IC are next produced. The contents of the register 102 will now be samples Sn through S2*n*−1, in the stages IR1 through IRN, respectively. The contents of the register 103 will be Sn, in all of the stages of the register.

Three possible sequences of operation may follow. A first sequence will ensue if a pulse IC is next produced, and, following that pulse, a pulse OC is produced. The pulse IC will advance the contents of the register 102 to Sn+1 through S2n. At the pulse OC, the contents of the register 103 will not be changed because all stages still contain the sample Sn. Just following that pulse, however, a LOAD pulse will be produced to transfer Sn+1 through S2n to the stages OR1 through ORN, respectively. The output signal will change from Sn to Sn+1 at essentially the same time that it would normally be changed, except for the negligible delay between the 2Nth pulse OC and the LOAD pulse, provided to allow the contents of the register to settle. The output will be fully compensated, with no samples lost or repeated.

A second sequence of operations will occur if a pulse OC is next produced and a pulse IC is then produced. The pulse OC will not change the contents of the register 103, but it will be quickly followed by a LOAD pulse that will transfer Sn through S(2n−1) to the register 103. That will cause the sample Sn to remain in the register OR1 and be repeated. The other samples will be properly gated out, however, and one such occurrence will not affect the output signal appreciably. The same sequence of operations will occur if the next two pulses are both OC pulses, so far as the output signal is concerned. Subsequent operation in that event will depend on how many pulses IC are produced before the 3Nth pulse OC causes another LOAD pulse to be produced.

A third sequence of operations will occur if the next two pulses are both IC pulses, and these are followed by an OC pulse. The IC pulses will advance the register 102 to store samples Sn+2 through S2n+1. At the LOAD pulse following the pulse OC, the contents of the register 103 will be changed, from Sn in all stages, to Sn+2 through S2n+1. The output signal will thus jump from Sn to Sn+2. Again, this event does not materially affect the output signal as long as it does not occur too frequently.

The repeat and overflow conditions just described can be reduced or eliminated by employing a large enough memory, or by using the electronic and electromechanical servomechanisms described above to cause the pulses OC to gradually track the pulses IC, to control the playback speed, or both.

A particular advantage of the invention, in any of its embodiments described above, is that, by relaxing the requirements on the uniformity of the film speed at the playback head, the bobulator roller 12 can effect sufficient isolation between the playback station and the projection station with only small changes in the length of the film path between those stations. Accordingly, lip synchronization may be preserved without any additional apparatus.

The invention is especially well adapted to the production of sound motion pictures. However, it will be apparent that the methods and apparatus of the invention are also adapted to the compensation of other recorded signals, such as the signals from tape and disc recorders and the like, or indeed to the compensation of any signal that can be associated with a pilot signal, to remove any frequency shifts that both signals may experience.

While the invention has been described with respect to the details of various illustrative embodiments, many changes and variations will occur to those skilled in the art in reading this description. Such can obviously be made without departing from the scope of the invention.

Having thus described the invention, what is claimed is:

1. In combination with a motion picture projector having a projection station, film drive means located at said projection station for intermittently advancing a strip of film through said projection station to facilitate the projection of images on the film, and transducer means at a playback station spaced from said projection station for reproducing a constant frequency reference signal and an audio signal recorded on the film, motion damping means located between said projection station and said playback station and adapted to engage a strip of film passing between said station for converting the intermittent motion of the film produced by said film drive means at said projection station into a relatively uniform but varying film motion at said playback station, storage means, sampling means responsive to a reference signal reproduced by said transducer means for storing samples of an audio signal reproduced by said transducer means in said storage means at a rate determined by the frequency of the reproduced reference signal, an audio output terminal, and output signal producing means for applying samples from said storage means to said output terminal at a rate determined by the average rate at which the reference signal is reproduced over a period that is long with respect to the average interval between the storage of samples in said storage means.

2. The apparatus of claim 1, further comprising means for holding a strip of film in tension along a path through said playback station and said projection station as the film is incrementally advanced by said drive means, and in which said motion damping means comprises resiliently biased film engaging means for applying a force to the film with a component normal to said path to vary the length of film between said playback station and said projection station.

3. The apparatus of claim 1, in which said storage means comprises an analog-to-digital converter having digital output terminals and an analog input terminal connected to said transducer means to receive a reproduced audio signal, a set of digital storage registers interconnected as a shift register, and a digital-to-analog converter having digital input terminals and an analog output terminal connected to said audio output terminal, said shift register having an output stage comprising one of said storage registers toward which the contents of said other registers are sequentially shifted upon the application of shift pulses to said shift register, said output stage being connected to said digital input terminals, said sampling means comprising gating means controlled by the contents of said shift register and responsive to a reference signal reproduced by said transducer means for connecting said digital output terminals to the nearest vacant stage of said shift register to said output stage as long as any of said stages is vacant, at a rate determined by the rate at which said reference signal was recorded, and said output signal producing means comprising means for applying shift pulses to said shift register.

4. The apparatus of claim 1, in which said film drive means comprises an intermittent film engaging element driven by a variable speed motor, and further comprising sensing means controlled by said sampling means and said output signal producing means for adjusting the speed of said motor to decrease any difference between the average rates of storing samples and applying the stored samples to said output terminal.

5. The apparatus of claim 1, in which said storage means comprises first and second shift registers, each having an input stage and an output stage, said sampling means comprising means for applying an information signal reproduced by said transducer means to said input stage of said first shift register and means for shifting the contents of said first shift register from stage to stage at a rate determined by the frequency of a reference signal reproduced by said transducer means, and said output signal producing means comprising means for shifting the contents of said second shift register from stage to stage at a rate determined by the rate at which the reference signal was recorded, means for transferring the contents of said first shift register to said second shift register each time said second shift register has been shifted once for each stage, and means for connecting said output stage of said second shift register to said audio output terminal.

6. The apparatus of claim 1, further comprising integrating means controlled by said sampling means and said output signal producing means for producing a control signal in accordance with the average difference between said rates, and means responsive to said control signal for adjusting said output signal producing means to bring the rate at which samples are applied to said audio output terminal toward said average.

7. The apparatus of claim 6, in which said film drive means comprises a variable speed motor and means driven by said motor for intermittently advancing film at a rate determined by the speed of said motor, and further comprising means controlled by said sampling means and said output signal producing means for controlling the speed of said motor to reduce the difference between the rate at which samples are stored in said storage means and the rate at which samples are applied to said audio output terminal.

8. A sound motion picture projection system, comprising means forming a projection station at a first location, means forming a playback station comprising transducer means adapted to reproduce an audio signal at a second location spaced from said first location, means for mounting a strip of motion picture film on which a series of photographic images, an accompanying sound signal, and a pilot signal are recorded for movement along a path between said projection station and said playback station, incremental drive means at said projection station for incrementally moving a strip of film along said path, means located along said path between said projection station and said playback station for damping accelerations of film moving along said path to produce a relatively uniform film speed at said playback station when the film is moved incrementally past said playback station, means controlled by said transducer means for simultaneously reproducing separate sound and pilot signals from a strip of film moving past said playback station, means for storing samples of the reproduced sound signal at a rate determined by the frequency of said reproduced pilot signal, a loudspeaker, and means for applying stored samples from said storage means to said loudspeaker in the order in which they were stored at a second rate, and means effective when the number of samples stored exceeds the number of samples applied to said loudspeaker by a predetermined number for omitting a sample from said storage means.

9. Apparatus for reproducing a motion picture and an accompanying sound signal recorded on a strip of film simultaneously with a constant frequency pilot signal, comprising transducer means for simultaneously reproducing the sound signal and the pilot signal when the strip is moved past said transducer means, said signals being reproduced at frequencies dependent on the speed of said movement, projection means spaced from said transducer means for projecting optical images from images on the film when the film is incrementally moved past said projection means, film receiving means for mounting the film for movement past said transducer means and said projection means, film drive means adjacent said projection means and adapted to engage a strip of film mounted on said receiving means to incrementally advance the film past said projection means, motion damping means mounted between said transducer means and said projection means and adapted to engage a strip of film mounted on said receiving means to damp changes in the speed of the film past said transducer means when the film is incrementally advanced by said drive means, storage means responsive to said reproduced pilot signal for storing samples of said reproduced information signal at a first rate determined by the frequency of said reproduced pilot signal, a loudspeaker, means for applying samples from said storage means to said loudspeaker at a second rate determined by the average frequency at which said pilot signal is reproduced over a predetermined period, and means effective when said memory is filled to capacity for rejecting a sample.

10. In a sound motion picture projector, film support means for supporting a strip of film on which photographic images, an audio information signal, and a pilot signal have been synchronously recorded for movement back and forth along a path between a playback station and a projection station, film drive means adjacent said projection station for incrementally advancing a strip of film supported by said support means past said projection station, projection means adjacent said projection station for projecting the images recorded on the film, motion damping means located between said stations and adapted to engage a strip of film supported by said support means to produce a film speed past said playback station in accordance with the average speed of the film past said projection station when the film is incrementally advanced by said drive means, transducer means located at said playback station for simultaneously reproducing the information signal and the pilot signal from a strip of film moving past said playback station, storage means controlled by said transducer means for storing samples of the reproduced information signal at a first rate dependent on the frequency of the reproduced pilot signal, speaker means, means for supplying samples from said storage means to said speaker in the order in which they were stored and at a second rate dependent on the average of said first rate over a period that is long compared to the intervals between the storage of samples in said first means, and means responsive to a predetermined excess of samples applied to said storage means over samples supplied to said speaker for rejecting a sample from said storage means.

11. A sound motion picture projection system, comprising means forming a projection station at a first location, means forming a playback station comprising transducer means adapted to reproduce an audio signal at a second location spaced from said first location, means for mounting a strip of motion picture film on which a series of photographic images, an accompanying sound signal, and a pilot signal are recorded for movement along a path between said projection station and said playback station, incremental drive means at said projection station for incrementally moving a strip of film along said path, means located along said path between said projection station and said playback station for damping accelerations of film moving along said path to produce a relatively uniform film speed at said playback station when the film is moved incrementally past said playback station, means controlled by said transducer means for simultaneously reproducing separate sound and pilot signals from a strip of film moving past said playback station, means for storing samples of the reproduced sound signal at a rate determined by the frequency of said reproduced pilot signal, a loudspeaker, and means for applying stored samples from said storage means to said loudspeaker in the order in which they were stored at an adjustable rate, and means responsive to the average difference between the rates at which said samples are stored and applied to said loudspeaker to control said adjustable rate to reduce said average difference.

12. Apparatus for reproducing a motion picture and an accompanying sound signal recorded on a strip of film simultaneously with a constant frequency pilot signal, comprising transducer means for simultaneously reproducing the sound signal and the pilot signal when the strip is moved past said transducer means, said signals being reproduced at frequencies dependent on the speed of said movement, projection means spaced from said transducer means for projecting optical images from images on the film when the film is incrementally moved past said projection means, film receiving means for mounting the film for movement past said transducer means and said projection means, film drive means adjacent said projection means and adapted to engage a strip of film mounted on said receiving means to incrementally advance the film past said projection means, motion damping means mounted between said transducer means and said projection means and adapted to engage a strip of film mounted on said receiving means to damp changes in the speed of the film past said transducer means when the film is incrementally advanced by said drive means, storage means responsive to said reproduced pilot signal for storing samples of said reproduced information signal at a first rate determined by the frequency of said reproduced pilot signal, a loudspeaker, adjustable means for applying samples from said storage means to said loudspeaker at a second rate, and integrating means responsive to the average difference between said rates to adjust said adjustable means to reduce said average difference.

13. In a sound motion picture projector, film support means for supporting a strip of film on which photographic images, an audio information signal, and a pilot signal have been synchronously recorded for movement back and forth along a path between a playback station and a projection station, film drive means adjacent said projection station for incrementally advancing a strip of film supported by said support means past said projection station, projection means adjacent said projection station for projecting the images recorded on the film, motion damping means located between said stations and adapted to engage a strip of film supported by said support means to produce a film speed past said playback station in accordance with the average speed of the film past said projection station when the film is incrementally advanced by said drive means, transducer means located at said playback station for simultaneously reproducing the information signal and the pilot signal from a strip of film moving past said playback station, storage means controlled by said transducer means for storing samples of the reproduced information signal at a first rate dependent on the frequency of the reproduced pilot signal, speaker means, adjustable means for supplying samples from said storage means to said speaker means in the order in which they were stored and at a second rate variable about the frequency at which the pilot signal was recorded, and integrating means responsive to the average difference between said rates for adjusting said adjustable means to reduce said difference.

14. In combination with a motion picture projector comprising projection means for projecting images from a strip of film incrementally moving past said projection means, transducer means located in spaced relation to said projection means for simultaneously reproducing an audio signal and a pilot signal recorded on a strip of film moved past said transducer means, and means mounted adjacent said projection means for incrementally advancing a strip of film past said projection means, motion damping means located between said projection means and said transducer means for smoothing the speed of film moving between said transducer means and said projection means, storage means controlled by said transducer means for storing samples of the reproduced audio signal at a rate determined by the frequency of the reproduced pilot signal, a speaker, a variable frequency oscillator, means controlled by said oscillator for supplying stored samples from said storage means to said speaker at a rate determined by the frequency of said oscillator, integrating means for detecting the average difference between the rates at which samples are stored and the rate at which samples are supplied to said speaker, and means controlled by said detecting means for varying the frequency of said oscillator to reduce said average difference.

15. A sound motion picture projection system, comprising means forming a projection station at a first location, means forming a playback station comprising transducer means adapted to reproduce an audio signal at a second location spaced from said first location, means for mounting a strip of motion picture film on which a series of photographic images, an accompanying sound signal, and a pilot signal are recorded for movement along a path between said projection station and said playback station, incremental drive means at said projection station for incrementally moving a strip of film along said path, means located along said path between said projection station and said playback station for damping accelerations of film moving along said path to produce a relatively uniform film speed at said playback station when the film is moved incrementally past said playback station, means controlled by said transducer means for simultaneously reproducing separate sound and pilot signals from a strip of film moving past said playback station, means for storing samples of the reproduced sound signal at a rate determined by the frequency of said reproduced pilot signal, a loudspeaker, and means for applying stored samples from said storage means to said loudspeaker in the order in which they were stored at a fixed rate.

16. Apparatus for reproducing a motion picture and an accompanying sound signal recorded on a strip of film simultaneously with a constant frequency pilot signal, comprising transducer means for simultaneously reproducing the sound signal and the pilot signal when the strip is moved past said transducer means, said signals being reproduced at frequencies dependent on the speed of said movement, projection means spaced from said transducer means for projecting optical images from images on the film when the film is incrementally moved past said projection means, film receiving means for mounting the film for movement past said transducer means and said projection means, film drive means adjacent said projection means and adapted to engage a strip of film mounted on said receiving means to incrementally advance the film past said projection means, motion damping means mounted between said transducer means and said projection means and adapted to engage a strip of film mounted on said receiving means to damp changes in the speed of the film past said transducer means when the film is incrementally advanced by said drive means, storage means responsive to said reproduced pilot signal for storing samples of said reproduced information signal at a first rate determined by the frequency of said reproduced pilot signal, a loudspeaker, and means for applying samples from said storage means to said loudspeaker at a rate determined by the frequency at which said pilot signal was recorded.

17. In a sound motion picture projector, film support means for supporting a strip of film on which photographic images, an audio information signal, and a pilot signal have been synchronously recorded for movement back and forth along a path between a playback station and a projection station, film drive means adjacent said projection station for incrementally advancing a strip of film supported by said support means past said projection station, projection means adjacent said projection station for projecting the images recorded on the film, motion damping means located between said stations and adapted to engage a strip of film supported by said support means to produce a film speed past said playback station in accordance with the average speed of the film past said projection station when the film is incrementally advanced by said drive means, transducer means located at said playback station for simultaneously reproducing the information signal and the pilot signal from a strip of film moving past said playback station, storage means controlled by said transducer means for storing samples of the reproduced information signal at a rate dependent on the frequency of the reproduced pilot signal, speaker means, and means for supplying samples from said storage means to said speaker in the order in which they were stored and at a rate dependent on the frequency at which the pilot signal was recorded.

18. In combination with a motion picture projector comprising projection means for projecting images from a strip of film incrementally moving past said projection means, transducer means located in spaced relation to said projection means for simultaneously reproducing an audio signal and a pilot signal recorded on a strip of film moved past said transducer means, and means mounted adjacent said projection means for incrementally advancing a strip of film past said projection means, motion damping means located between said projection means and said transducer means for smoothing the speed of film moving between said transducer means and said projection means, storage means controlled by said transducer means for storing samples of the reproduced audio signal at a rate determined by the frequency of the reproduced pilot signal, a speaker, and means for supplying stored samples from said storage means to said speaker at a rate determined by the frequency at which the pilot signal was recorded.

* * * * *

UNITED STATES PATENT OFFICE
CERTIFICATE OF CORRECTION

Patent No. 3,832,045 Dated August 27, 1974

Inventor(s) Stewart W. Wilson and Edwin K. Shenk

It is certified that error appears in the above-identified patent and that said Letters Patent are hereby corrected as shown below:

On the title page, after the inventors' names, insert --[73] Assignee: Polaroid Corporation, Cambridge, Massachusetts--.

Signed and sealed this 4th day of February 1975.

(SEAL)
Attest:

McCOY M. GIBSON JR.
Attesting Officer

C. MARSHALL DANN
Commissioner of Patents